United States Patent [19]

Kato

[11] Patent Number: 4,767,257
[45] Date of Patent: Aug. 30, 1988

[54] INDUSTRIAL ROBOT

[75] Inventor: Hisao Kato, Aichi, Japan

[73] Assignee: Mitsubishi Denki Kabushiki Kaisha, Tokyo, Japan

[21] Appl. No.: 911,706

[22] Filed: Sep. 26, 1986

[30] Foreign Application Priority Data

Dec. 23, 1985 [JP] Japan .................................. 60-287690
Dec. 23, 1985 [JP] Japan .................................. 60-287691
Feb. 26, 1986 [JP] Japan .................................. 61-39287
Feb. 26, 1986 [JP] Japan .................................. 61-39288

[51] Int. Cl.⁴ .............................................. B66C 23/00
[52] U.S. Cl. ................................ 414/744 A; 414/918;
901/15; 901/28; 901/50; 350/96.20; 350/96.21;
285/190; 439/191
[58] Field of Search ........................ 901/50, 15, 22, 23,
901/47, 27–29, 14, 19; 339/8 R, 8 A, 8 P, 8 PB,
; 350/96.20, 96.21; 285/190, 273, 274; 414/730,
735, 737, 744 A, 744 B, 744 R; 280/240–242;
248/278, 282

[56] References Cited

U.S. PATENT DOCUMENTS

| | | | |
|---|---|---|---|
| 609,283 | 8/1898 | Long | 285/190 X |
| 929,473 | 7/1909 | Nilsson | 339/8 P |
| 1,562,669 | 11/1925 | Weber | 285/190 |
| 2,083,970 | 6/1937 | Walter | 285/190 X |
| 2,322,011 | 6/1943 | French | 339/8 R |
| 3,195,094 | 7/1965 | Mohr | 339/8 PB |
| 3,587,872 | 6/1971 | Pauly | 901/36 X |
| 3,781,037 | 12/1973 | Czajkowski | 280/421 |
| 4,027,945 | 6/1977 | Iverson | 350/96.22 |
| 4,378,959 | 4/1983 | Susnjara | 901/37 X |
| 4,420,199 | 12/1983 | Vis et al. | 901/50 X |
| 4,437,638 | 3/1984 | Scheibenpflug | 248/282 |
| 4,475,751 | 10/1984 | Nishimura | 280/421 X |
| 4,507,042 | 3/1985 | Suzuki et al. | 414/680 |
| 4,529,352 | 7/1985 | Suzuki et al. | 414/918 X |
| 4,641,915 | 2/1987 | Asakawa et al. | 350/96.2 X |
| 4,678,952 | 7/1987 | Peterson et al. | 901/29 X |
| 4,698,479 | 10/1987 | Rando et al. | 901/42 X |

FOREIGN PATENT DOCUMENTS

| | | | |
|---|---|---|---|
| 0102082 | 3/1984 | European Pat. Off. | |
| 0169554 | 1/1986 | European Pat. Off. | |
| 2228598 | 1/1974 | Fed. Rep. of Germany. | |
| 8700789 | 2/1987 | PCT Int'l Appl. | 901/15 |
| 860492 | 7/1958 | United Kingdom | 280/421 |

Primary Examiner—Robert J. Spar
Assistant Examiner—Jennifer L. Doyle
Attorney, Agent, or Firm—Sughrue, Mion, Zinn, Macpeak and Seas

[57] ABSTRACT

A piping for control/drive medium of an industrial robot having at least one robot arm, which is to be supplied from a main body of the robot to a hand device thereof, is composed of a plurality of pipe segments adjacent ones of which are connected by a rotary joint disposed on a joint portion of the robot arm, with a rotary axis of the rotary joint being aligned with a rotary center of the joint portion.

10 Claims, 5 Drawing Sheets

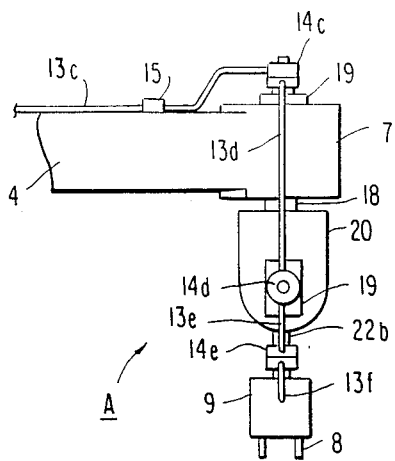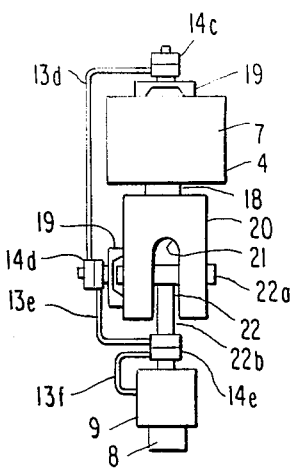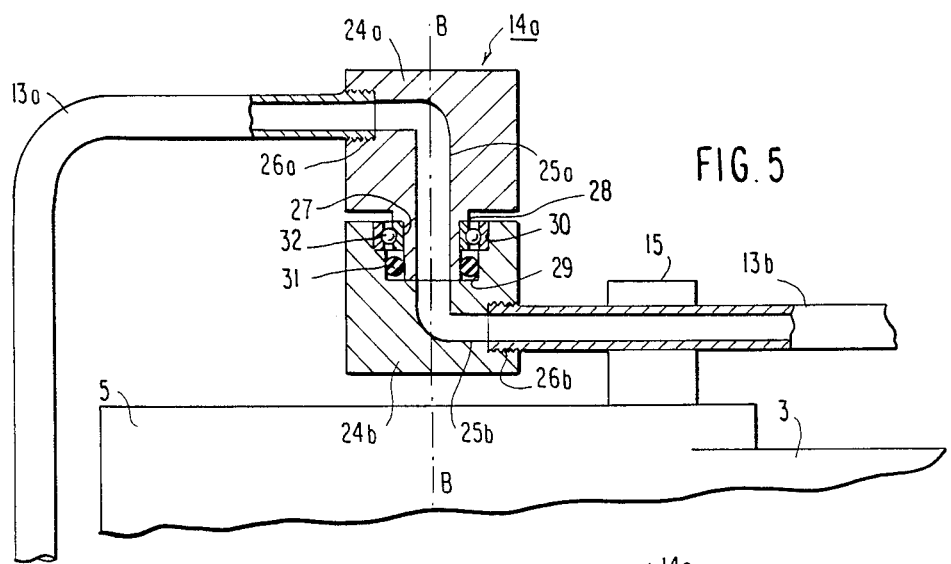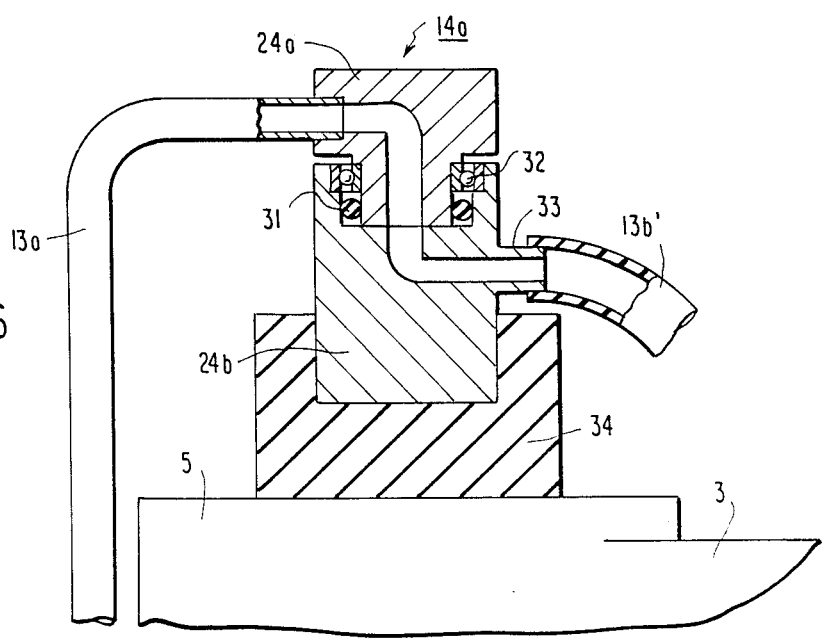

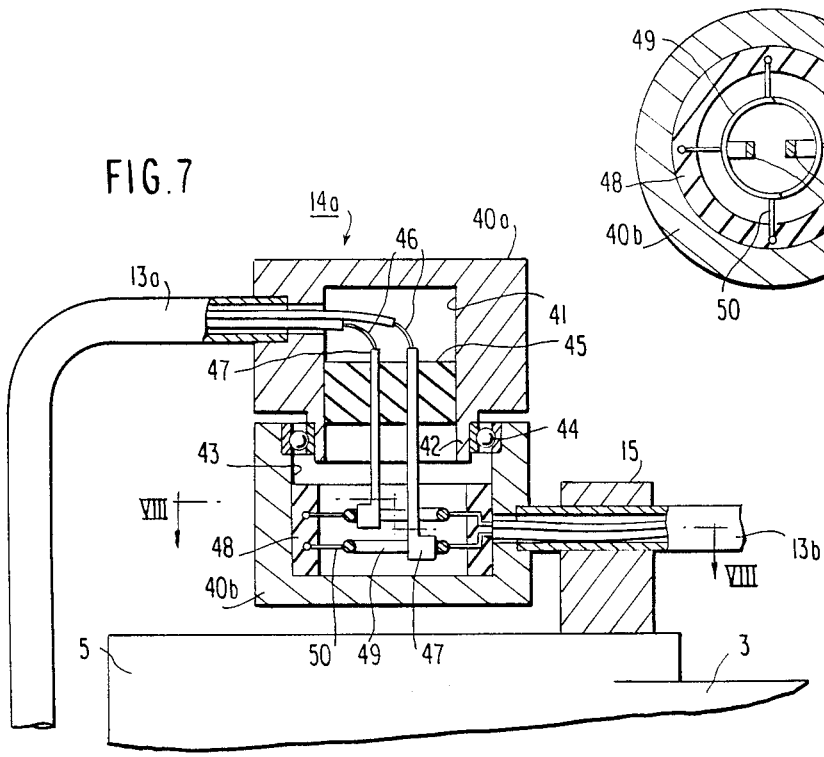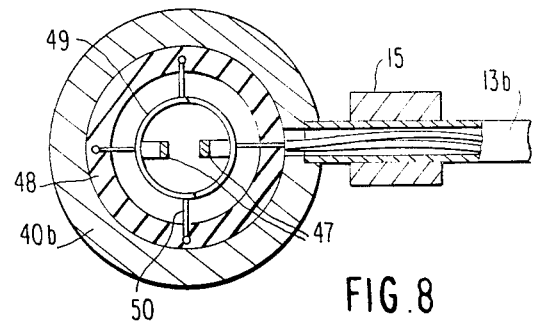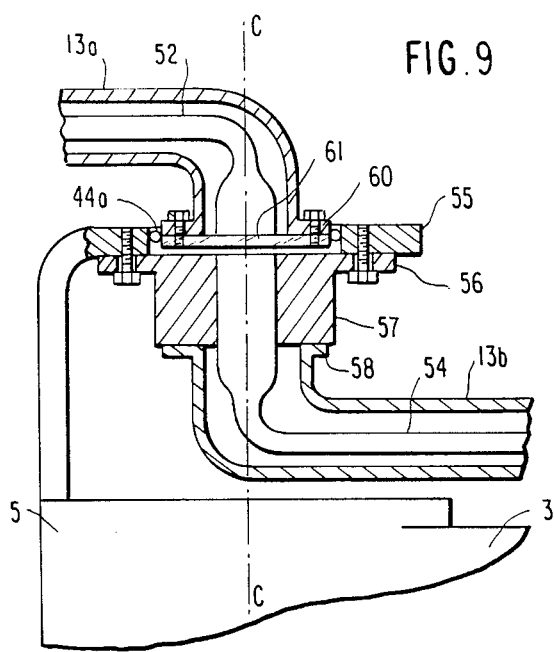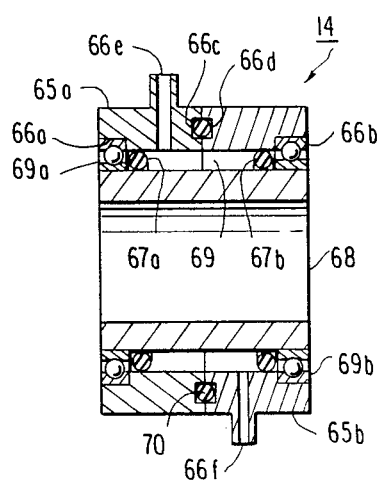

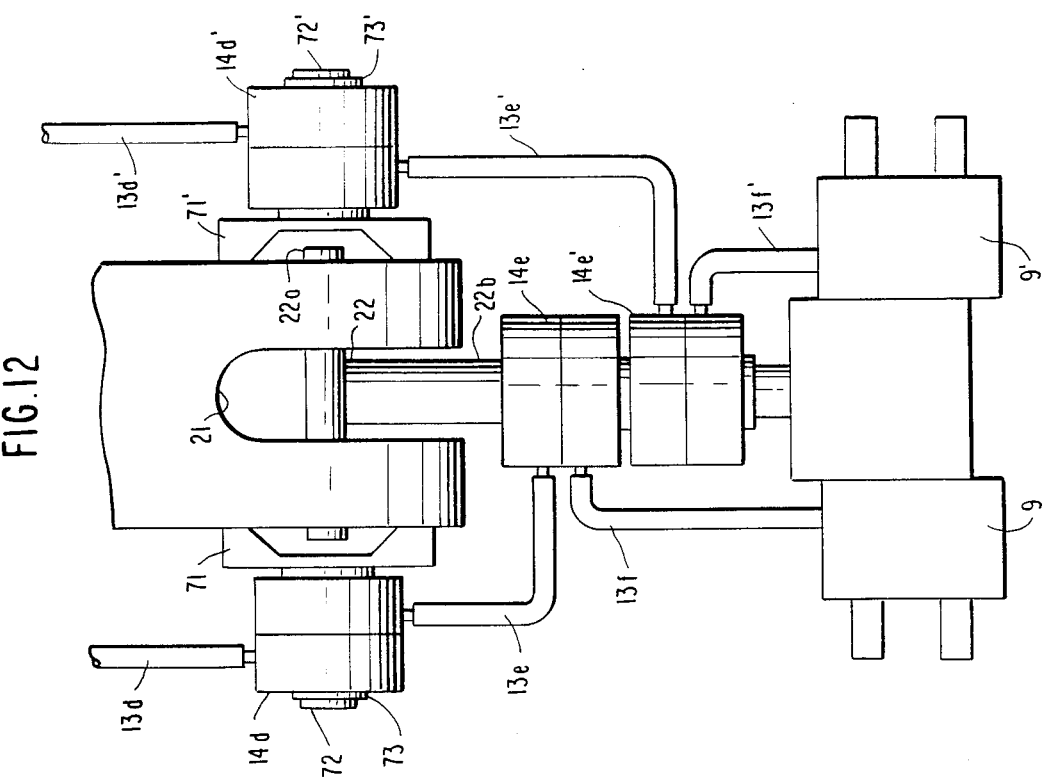
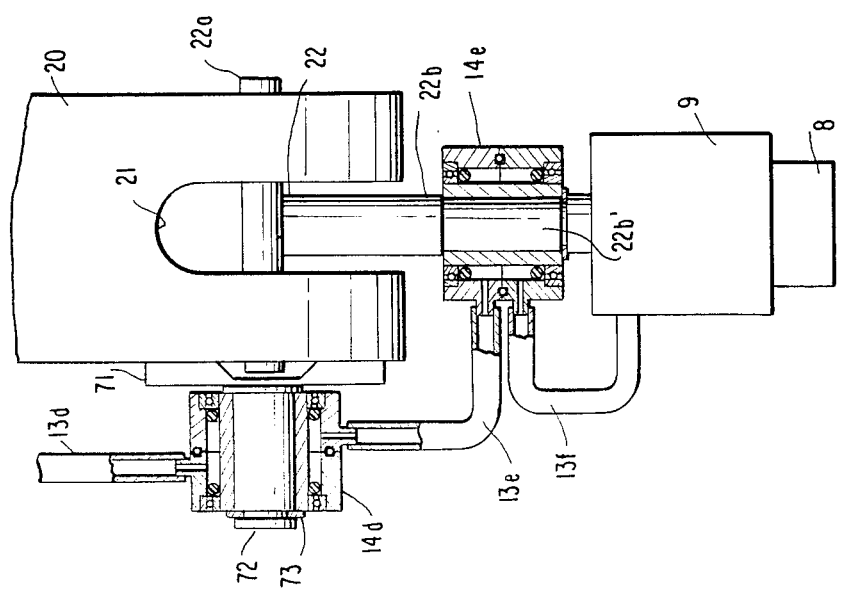

INDUSTRIAL ROBOT

BACKGROUND OF THE INVENTION

The present invention relates to an industrial robot having a hand device controlled and/or driven by a control/drive medium such as fluid, light and/or electric signals and, particularly, to a piping or wiring for such medium supplied from a main body of the robot through robot arms which are to be rotated with respect to the main body, respectively, to the hand device.

PRIOR ART

Japanese Kokai No. 146786/1984 discloses a piping for a control/drive medium of an industrial robot, which is shown in FIG. 1, schematically. In FIG. 1, a main body 1 of the industrial robot supports an elevation member 2 which is vertically movable with respect to the main body 1. A first robot arm 3 has one end portion 5 supported by the elevation member 2, which is rotatable in a horizontal plane about the elevation member 2 by means of a drive unit housed in the end portion 5. The other end portion 6 of the first arm 3 is connected to one end of a second arm 4. The second arm 4 is rotatable in a horizontal plane with respect to the end portion 6 of the first arm 3 by means of a drive unit housed in the end portion 6. A shaft extends downwardly from the other end portion 7 of the second arm 4 which is rotated by means of a drive unit housed in the end portion 7. From a free end of the shaft, a hand device 9 having a gripper 8 is suspended.

A fluid-tight, flexible tube 10 is provided between the main body 1 and the hand device 9 for suppling a control/drive medium to the hand device 9 to operate the gripper 8. The flexible tube 10 is supported partially by clamps 15 fixedly provided on the first and second arms 3 and 4, with portions thereof which pass over joint portions of adjacent components being looped to allow relative movements thereof. That is, the loopings of the flexible tube 10 are adapted to allow the vertical movement of the elevation member 2 with respect to the main body 1, a rotational movement of the first arm 3 with respect to the elevation member 2, a rotational movement of the second arm 4 with respect to the first arm 3, and a rotational movement of the hand device 9 with respect to the second arm 4.

In such conventional industrial robot, however, it is unavoidable that, even if such loopings are provided in portions of the flexible tube which are subjected to deforming stresses, respectively, looped portions are still bent and/or twisted, frequently, and deformed, ultimately, as shown by chain lines. Thus, problems of material fatigue of the tube, particularly, portions thereof which are deformed substantially, and hence troublesome maintenance thereof still remain unresolved. These problems may be more severe when the medium is light. That is, an optical cable is easily worn out by repetitive stress applications and the flexibility thereof is much lowered, resulting in breakage. This is also true for electrical signal cables, although the severity of the problem is lower than for optical cables.

SUMMARY OF THE INVENTION

An object of the present invention is to provide an industrial robot which includes a piping or wiring for transmission of a control/drive medium such as fluid, optical and/or electric signals from a main body of the robot to a hand device thereof, the piping or wiring being hardly deformed by an operation of the robot.

The piping or wiring of the present invention is featured by having a rigid structure comprising a plurality of rigid pipe segments each provided fixedly on one of relatively movable components of the robot and by connecting adjacent ones of the pipe segments by means of a rotary joint arranged such that a rotary axis thereof is substantially in alignment with a rotary shaft around which one of the adjacent pipe segments rotates with respect to the other.

BRIEF DESCRIPTION OF THE DRAWINGS

FIG. 3 shows a hand portion of the robot shown in FIG. 2, in detail;

FIG. 4 is a front view of the hand portion in FIG. 3;

FIG. 5 shows in cross section, an embodiment of a rotary joint of the present piping shown in FIGS. 2 to 4;

FIG. 6 shows, in cross section, another embodiment of the present rotary joint;

FIG. 7 shows, in cross section, a further embodiment of the present rotary joint;

FIG. 8 is a cross section taken along a line VIII—VIII in FIG. 7;

FIG. 9 shows, in cross section, a still further embodiment of the present rotary joint;

FIG. 10 shows another embodiment of the present rotary joint;

FIGS. 11 and 12 show portions of the present piping to which the rotary joints in FIG. 10 are applied, respectively;

DETAILED DESCRIPTION OF THE PREFERRED EMBODIMENTS

Figure 1:
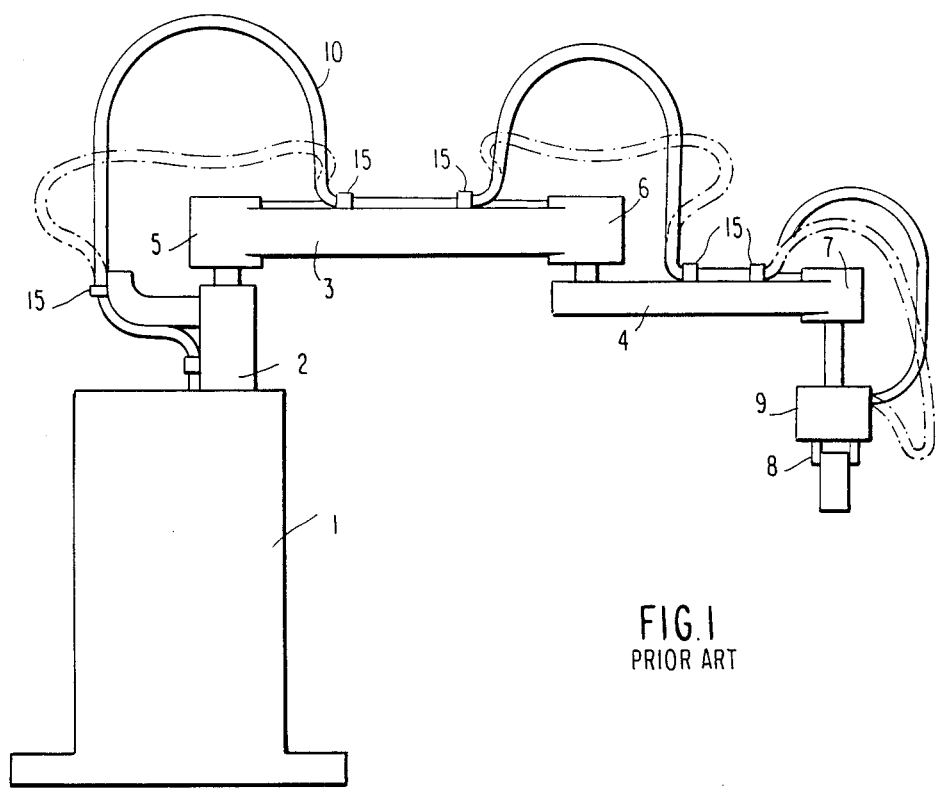
FIG. 1 shows, schematically, an industrial robot having a conventional control/drive medium piping.
Figure 2:
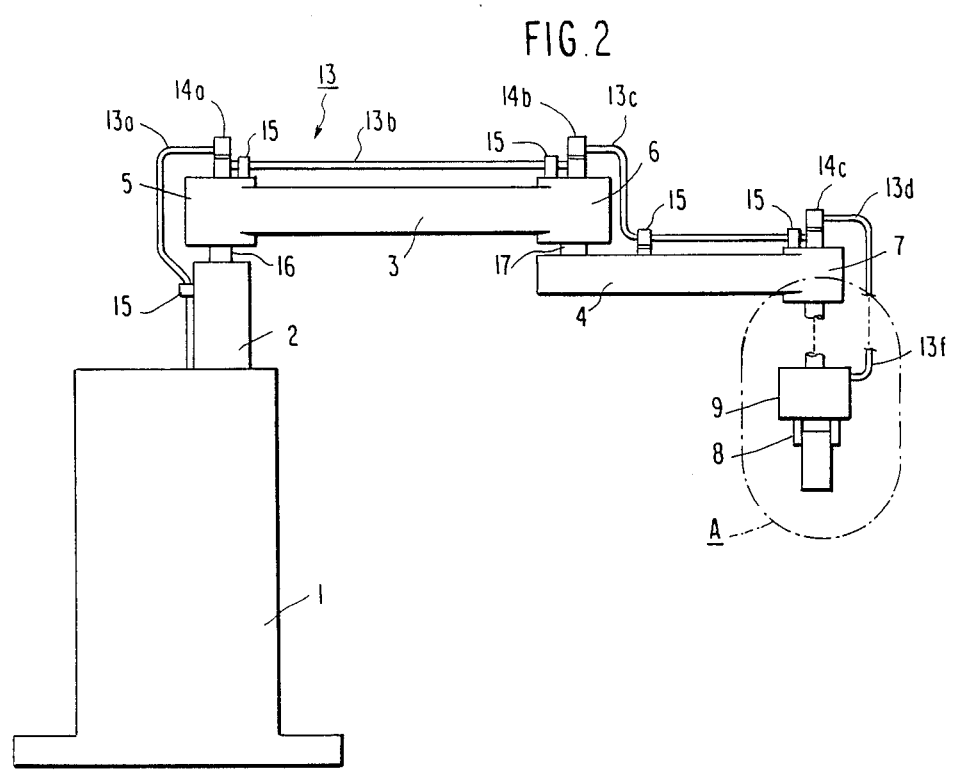
FIG. 2 shows an industrial robot having a novel piping according to the present invention.

In the drawings in which the same or similar components are depicted by the same reference numerals throughout, FIG. 2 shows an industrial robot having substantially the same mechanical structure as that shown in FIG. 1 except a hand portion thereof and a piping for a control/drive medium.

In FIG. 2, the piping, generally shown by a reference numeral 13, is composed of rigid pipe segments 13a to 13f, adjacent ones of which are connected by a rotary joint depicted, generally, by a reference numeral 14. The pipe segment 13a is fixedly secured to a main body 1 by a clamp 15 and extends therealong to a first rotary joint 14a provided on an end portion 5 of a first arm 3 while bypassing a joint portion of the latter. The pipe segment 13b is supported on the first arm 3 by clamps 15 provided fixedly on respective end portions 5 and 6 thereof and extends along the first arm 3 from the first rotary joint 14a to a second rotary joint 14b provided on the other end portion 6 of the first arm 3.

At this time, it should be noted that although the pipe segment 13b is shown as being supported by the clamps 15 with a gap with respect to an upper surface of the first arm 3, it is possible to arrange the pipe segment 13b directly on the arm 3 and this is also applicable to the other pipe segments.

The pipe segment 13c is clamped by clamps 15 disposed fixedly on opposite end portions of a second arm 4 and extends from the second rotary joint 14b to a third rotary joint 14c provided on the free end portion 6 of the second arm 4, from which the pipe segment 13d extends toward a region A including a hand device 9, which is shown in FIG. 3.

FIGS. 3 and 4 show the mechanism around the hand device 9, in detail. In FIG. 3, the pipe segment 13d extends to a fourth rotary joint 14d provided on a support member 20 and the pipe segment 13e extends from the fourth rotary joint 14d through a fifth rotary joint 14e from which the pipe segment 13f extends to the hand device 9.

The support member 20 has an upper portion supported rotatably by a rotary shaft 18 which is rotated by a drive unit housed in the free end portion 7 of the second arm 4 and a lower, rounded portion in which a groove 21 is formed. A T-shaped swing member 22 is received in the groove 21 and a bar portion 22a thereof is rotatably supported by sidewalls of the groove 21. A vertical portion 22b of the T-shaped swing member 22 is connected to the hand device 9 which is rotatable with respect to the vertical portion 22b by a drive unit housed in the hand device 9.

The pipe segment 13d extends from the third rotary joint 14c to the fourth rotary joint 14d which is disposed on a yoke member 19 fixed to the support 20 coaxially of the swing axis of the bar portion 22a of the swing member 22. The swing member 22 is driven by a suitable drive unit housed in the support 20. From the fourth rotary joint 14d, the pipe segment 13e extends to the fifth rotary joint 14e and the pipe segment 13f extends therefrom to the hand device 9.

FIG. 5 shows, in cross section, an embodiment of the rotary joint 14 of the present invention, which may be suitable to use when the control/drive medium is fluid. In FIG. 5, the rotary joint 14 disposed on the end portion 5 of the first arm 3 is depicted by reference numeral 14a. The rotary joint 14a is composed of an upper portion 24a and a lower portion 24b. The upper portion 24a has a lower protruded portion 28 a lower end portion of which has a reduced diameter to provide a reduced diameter portion 27, and the lower portion 24b is formed with a round hole having stepped diameters to provide a large diameter portion 30 and a small diameter portion 29. A bearing 32 is fitted in the large diameter portion 30 and supports the upper portion 24a rotatably as shown. An O-ring 31 of a low friction viscoelastic material such as soft fluorine resin is disposed between a space defined by walls of the small diameter portions of the upper and lower portions 24a and 24b. The upper portion 24a is formed with a reversed L-shape through-hole 25a and the lower portion 24b is formed similarly with an L-shaped through-hole 25b. Axially extending portions of the through-holes 25a and 25b are aligned as shown by a line B—B which is the rotary axis of the first arm 3 with respect to the elevation member 2 of the robot. Lateral ends 26a and 26b of the through-holes 25a and 25b have threads into which the pipe segments 13a and 13b are screwed, respectively. Thus, a passage for fluid medium is provided from the pipe segment 13a through the reversed L-shape hole 25a and the L-shape hole 25b to the pipe segment 13b.

Since the pipe segments 13a and 13b are rigid enough to support the rotary joint 14a, the latter is floatingly supported in this case. When the arm 3 is rotated in a horizontal plane by an actuation of the drive unit housed in the end portion 5 thereof, the lower portion 24b of the rotary joint 14a rotates with the rotation of the arm 3 since the upper portion 24a is fixedly supported by the pipe segment 13a, which is fixedly supported by the elevation member 2. In this case, since the rotary axis of the lower portion 24b is coincident with the rotary axis of the arm 3 with respect to the elevation member 2, the pipe segment 13a and the upper portion 24a are not subjected to any bending and/or twisting moment. It is clear for those skilled in the art that the rotary joint 14a is equally applicable to all of other arm joints.

Although the piping used in the embodiment shown in FIG. 2 is constituted with pipe segments all of which are formed of a material which is rigid enough to support the rotary joints, it is possible to use a flexible pipe for at least portions of the piping which usually receive no deforming stress. That is, it is not always necessary to make both adjacent pipe segments rigid. In FIG. 5, it is possible to make at least a portion of, for example, the pipe segment 13b flexible. That is, a portion of the pipe segment 13b between the clamps 15 on the arm 3 may not be rigid. In such case, the rotary joint connecting a rigid pipe segment and a flexible pipe segment may not be supported by the pipe segments themselves.

FIG. 6 shows another embodiment of the rotary joint of the present invention which is suitable to use in connecting a rigid pipe segment and a flexible pipe segment. In FIG. 6, a rotary joint 14a has substantially the same structure as that shown in FIG. 5 except that the lateral open end of the L-shaped through-hole of the lower portion 24b is protruded at 33 so that a flexible pipe segment 13b' can be fitted thereon, and the lower portion 24b is supported by an elastic member 34 such as rubber fixedly provided on the end portion 5 of the first arm 3, so that the rotary joint 14a is floatingly supported on the rotary axis of the arm 3. Therefore, even if the rotary center of the upper portion 24a connected to the rigid pipe segment 13a does not coincide exactly with the rotary center of the arm 3, a possible displacement therebetween can be absorbed by the elastic member 34 and/or the flexible pipe segment 13b'.

FIG. 7 shows another embodiment of the present invention. In FIG. 7, a rotary joint 14a is composed of an upper, generally cylindrical portion 40a and a lower cylindrical portion 40b. A bearing 44 is fitted in an upper edge portion of the lower block 40b. The bearing 44 supports the upper block 40a, rotatably.

A circular insulator block 45 is fixed to an inner wall 41 of the upper block 40a and an annular insulator block 48 is fixed to an inner wall of the lower block 40b. A pair of movable slide electrodes 47 of resilient material penetrate the circular insulator block 45 and are fixedly supported thereby. The slide electrodes 47 are different in length so that contact portions thereof are located at different levels and are biased radially outwardly so that the contact portions thereof become in pressure-slide contact with a pair of contact rings 49, respectively. As shown in FIG. 8 which is a cross section taken along a line VIII—VIII in FIG. 7, each of the contact rings 49 is supported by a plurality (four) of support legs 50 at least one of which is conductive.

A pair of cables 46 housed in pipe segment 13a fixed to the upper block 40a is connected to the movable electrodes 47, respectively, and the conductive support legs 50 are connected to a pair of cable housed in pipe segment 13b fixed to the lower block 40b. Thus, a signal on the cables 46 is passed through the movable electrodes 47, the contact rings 49 to the cables in the pipe segment 13b. Needless to say, the embodiment shown in FIGS. 7 and 8 is suitable when the control/drive medium is an electric signal.

FIG. 9 shows another embodiment of the present invention, which is suitable for use with light as the control/drive medium. In FIG. 9, the rotary joint is composed of an upper portion which comprises a transparent end plate 61 fixed to a flange 60 of pipe segment 13a and a lower portion which comprises a support member 55 having one end portion fixed to the end portion 5 of the first arm 3 and the other end portion formed with a circular opening in which the upper portion is received rotatably with a bearing 44a. The lower portion further comprises a block 57 having a flange 56 by which it is fixed to the other end portion of the support member 55. The block 57 supports an end of an optical cable 54 in the pipe segment 13b, fixedly, and mounts the flanged end 58 of the segment. The end portion of optical cable 54 aligns with an end portion of an optical cable 52 in pipe segment 13a so that an optical axis thereof coincides with a rotary axis C—C of the arm 3 with respect to the elevation member 2.

An operation of this rotary joint is the same as that of any of the preceding embodiments.

FIG. 10 shows another embodiment of the present rotary joint which may be applied, particularly, to a rotary joint when its rotary center should be supported in an exact alignment with the rotary center of the arm. In FIG. 10, a rotary joint 14 comprises an annular upper block 65a having a shouldered upper inner edge 66a and an annular groove 66c in a bottom thereof, an annular lower block 65b having a shouldered lower inner edge 66b and an annular groove 66d in an upper face thereof, an O-ring oil seal 70 disposed in an annular space defined by the annular grooves 66c and 66d of the upper and lower blocks 65a and 65b when assembled together, and a cylindrical sleeve 68 pressure-inserted into the assembly. The sleeve 68 supports the assembly through bearings 69a and 69b fitted in the shouldered edges of the assembly. The O-ring 70 is of the same or similar material to that of the O-ring 31 in FIG. 5. A passage 66e, 69, 66f for the medium, in this case, liquid, is defined by an inner wall of the assembly and an outer wall of the sleeve 68. O-rings 67a and 67b of the same material as that of the O-ring 70 prevent the medium from escaping through the bearings 69a and 69b. The rotary joint shown in FIG. 10 is used by fitting it on a pin extending in alignment with a rotary axis of the arm or other member of the robot. FIG. 11 shows an application of the rotary joint in FIG. 10 to a portion of the robot including the support member 20, the swing member 22 and the hand device 9 in FIGS. 3 and 4. In FIG. 11, the rotary joint in FIG. 10 is fitted, as the rotary joint 14d, on a pin 72 implanted on a base member 71 fixed to the support member 20 so that it extends coaxially with the bar portion 22a of the swing member 22. An axial movement of the rotary joint with respect to the pin 72 is prevented by a suitable member such as a C-washer 73. The rotary joint is also used, as the rotary joint 14e, on a vertical portion 22b of the swing member 22 to allow the hand device 9 to be rotated with respect to the vertical portion 22b by a drive unit housed in the hand device 9.

FIG. 12 shows another embodiment of the present invention in which the rotary joints shown in FIG. 10 are used to provide a pair of the medium passages to a robot having a pair of hand devices 9 and 9'. That is, the embodiment in FIG. 12 includes another set of the pipe segments 13d' to 13f' and the rotary joints 14d' and 14e', in addition to the set of the pipe segments 13d to 13f and the rotary joints 14d and 14e.

Figure 13:
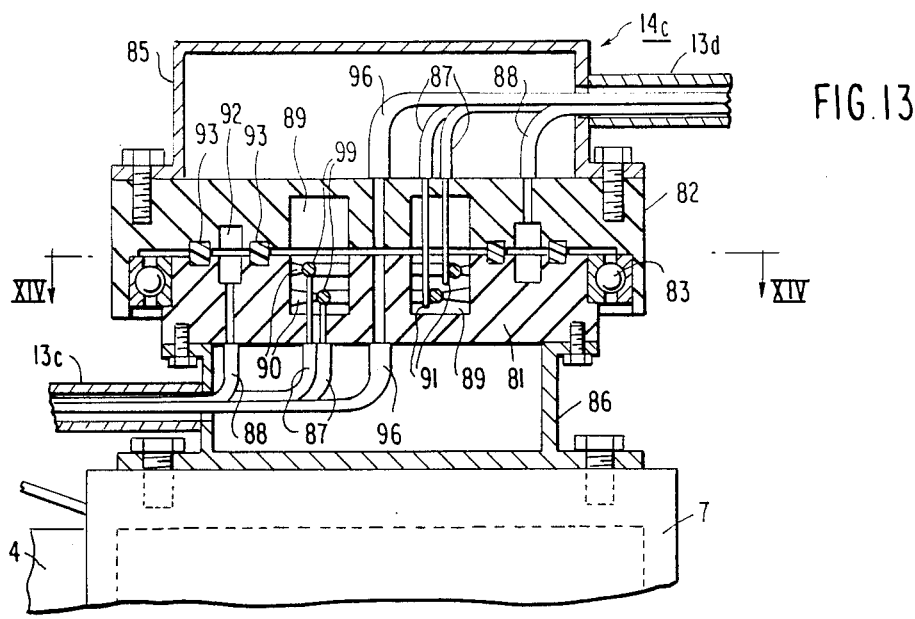
FIG. 13 is a cross section of a rotary joint according to another embodiment of the present invention.

FIG. 13 shows another embodiment of the present rotary joint which is suitable to use when the control/drive medium is a combination of light signal, electric signal and fluid pressure. In FIG. 13, a rotary joint 14c is shown as being provided to connect the pipe segment 13c and the pipe segment 13d which carrying a composite cable including an optical cable, a fluid hose and a pair of electric conductors.

The rotary joint 14c is composed of a lower base 81 of insulative material, an upper base 82 of insulative material, a ball bearing 83 provided between the lower and upper bases 81 and 82, an upper cover 85 and a lower cover 86 having a lower portion fixedly secured to the end portion 7 of the second arm 4. The pipe segment 13c is connected to the lower cover 86 and the pipe segment 13d is connected to the upper cover 85.

The upper base 82 has a center hole and is formed in a lower surface thereof with an annular inner groove 89 and an annular outer groove 92 arranged coaxially of the annular inner groove 89. A pair of annular grooves 93 are further arranged in both sides of the outer groove 92, respectively.

The lower base 81 has a center hole and is formed in an upper surface thereof with an annular groove 89, an outer groove 92 and a pair of annular grooves 93 arranged in both sides of the outer groove 92, such that the annular inner and outer grooves and the pair of the annular grooves on both sides of the outer annular groove of the lower base 81 are aligned with those on the lower surface of the upper base 82, respectively, to define an annular inner space, an annular outer space and a pair of annular spaces when the bases are assembled as shown. In the annular spaces on both sides of the outer annular space defined by the annular outer grooves 92, annular sealing members are fitted to prevent fluid leakage.

Figure 14:
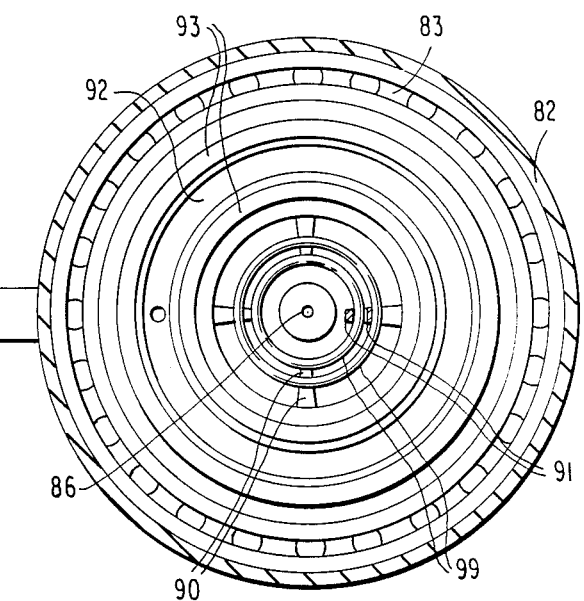
FIG. 14 is a cross section taken along a line XIV—XIV in FIG. 13.

In the annular inner groove 89 of the lower base 81, a pair of ring electrodes 99 are supported coaxially by a plurality (four) of support legs 90 as shown in FIG. 14 which is a cross section taken along a line XIV—XIV in FIG. 13 and connected to electric cables 87 extending from the pipe segment 13c through the lower cover 86. In the annular inner groove 89 of the upper base 82, a pair of slide contacts 91 of resilient material are provided fixedly. Free ends of the slide contacts 91 are biased radially outwardly to contact with the ring electrodes 99, respectively, and fixed ends thereof are connected to a pair of electric cables 87 extending to the pipe segment 13d.

A fluid hose 88 from the pipe segment 13c is connected to the annular outer groove 92 of the lower base 81 and a fluid hose 88 extending to the pipe segment 13d is connected to the annular outer groove 92 of the upper base 82. An optical cable 96 from the pipe segment 13c passes through the center hole of the lower base 81 and terminates at the upper surface thereof and an optical cable 96 to the pipe segment 13d extends through the center hole of the upper base 82 and terminates at the lower surface thereof.

Figure 15:
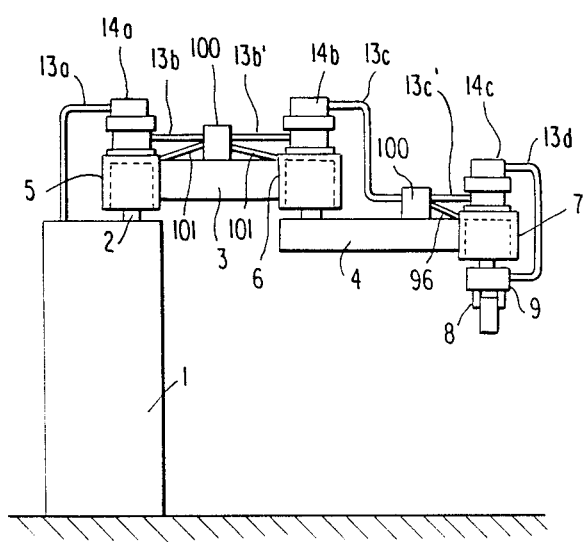
FIG. 15 is an industrial robot having a piping in which the rotary joint in FIGS. 13 and 14 is applied.

FIG. 15 shows an industrial robot in which the rotary joint shown in FIGS. 13 and 14 is used. In FIG. 15, the rotary joint 14c is also used for each of the joint portions of the robot and a distributor 100 is provided on each of the arms to branch the optical signal and/or electric signal to be carried by the respective cables in the pipe segments to the drive units housed in the respective end portions of the arms through protective pipes 101.

Although the respective embodiments of the present rotary joints have been described as applied to specific end portions of the robot arms, each of them can be applied to any or all of the end portions of the arms. The rigid pipe segment may be of metal or hard plastics such as polyvinyl chloride and other rigid members may be made of the same or similar materials.

As mentioned hereinbefore, according to the present invention, the piping of the control/drive medium to be supplied to the hand device of the industrial robot is composed of a plurality of generally rigid pipe segments adjacent ones of which are connected to each other by means of the rotary joint arranged on each arm joint with the rotary axis of the joint being at least substantially aligned with the rotary center of the arm joint. Therefore, there is no deforming stress applied to the pipe segments and thus no such stress applied to the cables housed in the pipe segments, resulting in a considerable improvement on the life of piping. Because of the segmented piping, the maintenance thereof becomes very easy.

What is claimed is:

1. An industrial robot, comprising: a vertically oriented main body (1, 2), robot arm means (3, 4) operatively connected to said main body and having a first joint portion (5) at one end housing a drive unit for moving said robot arm means with respect to said main body in a horizontal plane orthogonal to a longitudinal axis of said main body, a hand device (9) connected to another, opposite end of said robot arm means and movable with respect thereto by a drive unit housed in a second joint portion (7) thereof, and piping for supplying a control/drive medium from said main body to said hand device, said piping comprising a first pipe segment (13a) fixedly supported by said main body and extending vertically, a second pipe segment (13b, 13c) fixedly supported on said robot arm means and extending therealong, and a third pipe segment (13d) connected to said hand device, adjacent ones of said first, second and third pipe segments being connected by respective rotary joints (14a, 14c) individually disposed on said joint portions of said robot arm means with rotary axes of said rotary joints being individually aligned with rotary centers of said joint portions of said robot arm means, each rotary joint comprising a first member fixedly connected to one of said adjacent pipe segments and a second member fixedly connected to another pipe segment and coaxially disposed with said first member for relative rotation thereto.

2. The industrial robot as claimed in claim 1, wherein said control/drive medium is fluid pressure and wherein said first member is formed with a fluid passage segment, said second member is formed with a fluid passage segment, and bearing means are provided on said second member to support said first member rotatably with respect thereto, said fluid passage segments of said first and second members being coaxially aligned with said rotary axis of said rotary joint to provide a continuous fluid passage.

3. The industrial robot as claimed in claim 2, wherein said pipe segments are of rigid material and wherein said rotary joint is supported by said adjacent pipe segments substantially fixedly.

4. The industrial robot as claimed in claim 2, further comprising an elastic block member disposed between said rotary joint and said robot arm for absorbing a possible displacement of said rotary joint from said rotary center of said robot arm means, wherein at least one of said adjacent pipe segments is of rigid material and said rotary joint is supported by said one pipe segment and said elastic block member.

5. The industrial robot as claimed in claim 4, wherein said another pipe segment is of flexible material.

6. The industrial robot as claimed in claim 1, wherein said control/drive medium is fluid pressure, wherein said first member is a cylinder member (65a) connected through a wall thereof to said one adjacent pipe segment, and said second member is a cylinder member (65b) arranged coaxially with said first cylinder member and connected through a wall thereof to said another pipe segment, and further comprising an O-ring (70) disposed between said first and second cylinder members, a sleeve (68) pressure-inserted into said first and second cylinder members, bearing means (69a, 69b) for rotatably supporting said first and second cylinder members on said sleeve, and a pair of O-rings disposed in opposite sides of an annular space defined by inner walls of said first and second cylinder members and an outer wall of said sleeve, respectively, said rotary joint being fitted on a pin provided on said rotary center of said robot arm, coaxially thereto.

7. The industrial robot as claimed in claim 1, wherein said control/drive medium is a light signal and wherein said first member (55, 57) has one end fixedly secured to said joint portion of said robot arm means and the other end formed with an opening, said first member fixedly supporting an end of an optical cable (54) arranged in said one adjacent pipe segment, said second member (60, 61) being connected to said another pipe segment and fixedly holding an end of an optical cable (52) therein, said second member being rotatably received in said opening of said first member with optical axes of said cables being aligned with each other and with said rotary center of said joint portion of said robot arm means.

8. The industrial robot as claimed in claim 7, further comprising a distributor provided in said piping for branching the optical signal carried on said optical cable to said drive unit housed in said joint portion of said robot arm means.

9. The industrial robot as claimed in claim 1, wherein said control/drive medium is an electrical signal, wherein said first member has an inner circular space and a pair of parallel ring electrodes disposed therein, and said second member has an inner space and a pair of slide contacts adapted to pressure-contact with said ring electrodes slidably, respectively, and further comprising bearing means for supporting said first member rotatably with respect to said second member, said slide contacts being connected to electric cables arranged in one of said adjacent pipe segments, said ring electrodes being connected to electric cables arranged in another of said adjacent pipe segments.

10. The industrial robot as claimed in claim 1, wherein said control/drive medium is a combination of fluid pressure, optical signal and electric signal, and each of said pipe segments contains a fluid hose, an optical cable and a pair of electric conductors, and wherein said first member is a circular disc having a center hole and having a lower surface formed with a coaxial inner annular groove and a coaxial outer annular groove, and said second member is a circular disc having a center hole and an upper surface formed with a coaxial inner annular groove and a coaxial outer annular groove, and further comprising bearing means for supporting said first circular member rotatably with respect to said second circular member, said center holes supporting ends of said optical cables in said adjacent pipe segments in coaxial alignment, respectively, in pair of ring electrodes connected to said electric conductors in one of said adjacent pipe segments and supported in said inner annular groove of said second circular disc member and a pair of slide contacts connected to said electric conductors in the other of said adjacent pipe segments and supported in said inner annular groove of said first circular disc member such that contact portions of said slide contacts are in slidable pressure-contact with said ring electrodes, respectively, said outer annular groove of said second circular disc member being connected to said fluid hose in one of said adjacent pipe segments and said outer annular groove of said first circular disc member being connected to said fluid hose in another of said adjacent pipe segments.

* * * * *